United States Patent
Schlumm et al.

(10) Patent No.: US 10,046,811 B2
(45) Date of Patent: Aug. 14, 2018

(54) BOX BODY FOR A COMMERCIAL VEHICLE

(71) Applicant: Schmitz Cargobull AG, Altenberge (DE)

(72) Inventors: Michael Schlumm, Ahaus (DE); Reinhard Beelmann, Haaltern am See (DE); Peter Schmitz, Altenberge (DE)

(73) Assignee: Schmitz Cargobull AG, Altenberge (DE)

( * ) Notice: Subject to any disclaimer, the term of this patent is extended or adjusted under 35 U.S.C. 154(b) by 0 days.

(21) Appl. No.: 15/101,621

(22) PCT Filed: Dec. 4, 2014

(86) PCT No.: PCT/EP2014/076612
§ 371 (c)(1),
(2) Date: Jun. 3, 2016

(87) PCT Pub. No.: WO2015/082634
PCT Pub. Date: Jun. 11, 2015

(65) Prior Publication Data
US 2016/0304135 A1   Oct. 20, 2016

(30) Foreign Application Priority Data
Dec. 4, 2013 (EP) .................................... 13195689

(51) Int. Cl.
*B62D 33/00* (2006.01)
*B62D 33/04* (2006.01)
(Continued)

(52) U.S. Cl.
CPC .............. *B62D 33/048* (2013.01); *B32B 5/02* (2013.01); *B32B 5/024* (2013.01); *B32B 5/18* (2013.01);
(Continued)

(58) Field of Classification Search
CPC .. B62D 33/048; B62D 29/001; B62D 29/043; B32B 5/02; B32B 5/024; B32B 5/18;
(Continued)

(56) References Cited

U.S. PATENT DOCUMENTS

| 3,393,920 | A | * | 7/1968 | Ehrlich | ................ | B62D 33/048 |
| | | | | | | 280/423.1 |
| 7,901,537 | B2 | * | 3/2011 | Jones | ..................... | B32B 27/00 |
| | | | | | | 156/289 |
| 2008/0174147 | A1 | | 7/2008 | Skaradzinski | | |

FOREIGN PATENT DOCUMENTS

| CN | 101767611 A | 7/2010 |
| DE | 1704581 | 5/1971 |

(Continued)

*Primary Examiner* — Joseph D. Pape
(74) *Attorney, Agent, or Firm* — The Webb Law Firm

(57) ABSTRACT

A box body for a commercial vehicle, which has a surface element having a panel, includes a core layer, a dimensionally stable structural layer and an intermediate layer, one side thereof being adjacent to the core layer and an opposite side being adjacent to the structural layer. An integrally joined connection is produced between the structural layer and the side of the intermediate layer and between the core layer and the side of the intermediate layer. The intermediate layer has a thickness smaller than the thickness of the structural layer and consists of a material having a density that is higher than the density of the core layer. The side of the intermediate layer adjacent to the core layer has an affinity to the foamed plastic of the core layer and the side of the intermediate layer adjacent to the structural layer has an affinity to the structural layer.

15 Claims, 2 Drawing Sheets

(51) Int. Cl.
    B62D 29/00     (2006.01)
    B32B 5/02      (2006.01)
    B32B 5/18      (2006.01)
    B32B 5/22      (2006.01)
    B32B 5/26      (2006.01)
    B32B 7/12      (2006.01)
    B32B 15/04     (2006.01)
    B32B 15/08     (2006.01)
    B32B 15/14     (2006.01)
    B32B 15/18     (2006.01)
    B32B 15/20     (2006.01)
    B32B 27/36     (2006.01)
    B32B 15/095    (2006.01)
    B32B 27/32     (2006.01)
    B32B 27/34     (2006.01)
    B32B 27/40     (2006.01)
    B62D 29/04     (2006.01)

(52) U.S. Cl.
    CPC ............... *B32B 5/22* (2013.01); *B32B 5/26* (2013.01); *B32B 7/12* (2013.01); *B32B 15/04* (2013.01); *B32B 15/046* (2013.01); *B32B 15/08* (2013.01); *B32B 15/095* (2013.01); *B32B 15/14* (2013.01); *B32B 15/18* (2013.01); *B32B 15/20* (2013.01); *B32B 27/32* (2013.01); *B32B 27/34* (2013.01); *B32B 27/36* (2013.01); *B32B 27/40* (2013.01); *B62D 29/001* (2013.01); *B62D 29/043* (2013.01); *B32B 2250/05* (2013.01); *B32B 2255/06* (2013.01); *B32B 2260/021* (2013.01); *B32B 2260/046* (2013.01); *B32B 2262/10* (2013.01); *B32B 2262/101* (2013.01); *B32B 2262/106* (2013.01); *B32B 2266/0278* (2013.01); *B32B 2266/08* (2013.01); *B32B 2305/022* (2013.01); *B32B 2307/304* (2013.01); *B32B 2307/50* (2013.01); *B32B 2307/7242* (2013.01); *B32B 2307/7246* (2013.01); *B32B 2439/00* (2013.01); *B32B 2439/62* (2013.01); *B32B 2605/00* (2013.01)

(58) Field of Classification Search
    CPC .... B32B 5/22; B32B 5/26; B32B 7/12; B32B 15/04; B32B 15/046; B32B 15/08; B32B 15/095; B32B 15/14; B32B 15/18; B32B 15/20; B32B 27/32; B32B 27/34; B32B 27/36; B32B 27/40
    USPC ............................................. 296/181.6, 191
    See application file for complete search history.

(56) References Cited

FOREIGN PATENT DOCUMENTS

| | | |
|---|---|---|
| DE | 102005022868 A1 | 11/2006 |
| DE | 202007014441 U1 | 2/2008 |
| EP | 1667890 B1 | 6/2006 |

\* cited by examiner

BOX BODY FOR A COMMERCIAL VEHICLE

CROSS-REFERENCE TO RELATED APPLICATIONS

This application is the United States national phase of International Application No. PCT/EP2014/076612 filed Dec. 4, 2014, and claims priority to European Patent Application No. 13195689.8 filed Dec. 4, 2013, the disclosures of which are hereby incorporated in their entirety by reference.

BACKGROUND OF THE INVENTION

Field of the Invention

The invention relates to a box body for a commercial vehicle, such as a truck, trailer or semi-trailer for an articulated lorry, wherein the box body has at least one surface element with at least one panel, comprising a core layer, formed from a foamed plastic, a dimensionally stable structural layer and an intermediate layer, the one side thereof being adjacent to the core layer and the other side being adjacent to the structural layer. This creates an integrally joined connection between the structural layer and the side of the intermediate layer associated with it, on the one hand, and between the core layer and the side of the intermediate layer associated with it, on the other.

Description of Related Art

Box bodies of this kind are used in particular on commercial vehicles intended for the transport of temperature-sensitive goods on public highways. Where a box body is used here then, unlike other commercial vehicle superstructures, such as curtain-siders for example, a load compartment is surrounded by fixed surface elements, forming the side walls and the fixed roof of the box body. In this way, for example, the ingress of moisture into the load compartment of the commercial vehicle is prevented, meaning that the box bodies of the type referred to here are also used for dry transportation, i.e. the transport of moisture-sensitive goods.

The side walls and the roof of box bodies typically comprise one or more multilayer panels in a sandwich arrangement, comprising an inner core ply and respective outer layers on either side of the core ply. Here the panels can be held in place by a frame or similar, forming the base structure of the box body like a skeleton. Panels are also known, however, which are designed to make them suitable for actual direct bonding with the panels arranged adjoining them.

In order to improve the thermal insulation effect of the panels a foamed plastic can be used for their core layer. Foamed plastics suitable for this purpose have a low density and a low thermal conductivity, so that through appropriately constructed panels good insulation from the environment of the load compartment surrounded by the box body is achieved. Here the outer layers of the panels ensure the necessary stability and stiffness of the panels. The foam of the core layer can generally not provide this on its own because of its lack of stiffness and lack of inherent stability when force is applied. A further function of the outer layers is to protect the core layer from damage by external forces acting on the panel. To make this possible, the outer layers on known panels for box bodies generally consist of solid steel sheet of adequate thickness, which in order to optimise its optical appearance can be lacquered or coated on its exposed external side.

In the known panels the outer skin at the same time acts as a barrier, preventing the ingress of moisture, for example through the diffusion of vapour, in particular water vapour, into the panel.

Attempts have been made in the past, to use glass fibre reinforced plastics in place of the normal sheet metal outer layers in panels of the above mentioned kind, in order to reduce the weight of the panels and to increase their inherent stability. The problem with such panels, however, is that they are very expensive to manufacture.

A further fundamental problem for panels for box bodies of the type referred to here is the durable and secure bonding of the foam core layer to the respective outer layers. It is clear that only through additional measures, such as the application of adhesion-promoting coatings or a special surface activation of the respective surfaces of the core layer coming into contact with the foam, can a bonding of the core layer with the respective outer layer be achieved, such that flaking or peeling of the outer layer from the core layer under the difficult conditions to which the box bodies of the type referred to here are exposed in practice, can be reliably avoided.

DE 1704581 A1 proposes a solution to this problem in the form of a panel structure for commercial vehicles, in which an outer structural layer is bonded via intermediate layers direct-moulded onto it to a foam core layer.

Another example of an insulating panel, in the form of a multilayer composite and specially intended for use in insulated commercial vehicle trailers, containers or other insulated compartments, is described in EP 1667890 B1. The insulating panel comprises at least two substantially gas impermeable liner panels. When in use, one of these liner panels is associated with the respective area to be protected from the environment by the insulating panel and takes the form of an inherently stable laminate panel. To this end it has a gas impermeable barrier ply, comprising for example a thin aluminium or PET film, and at least one structural polymer resin ply disposed coplanar to the barrier ply, and bonded with the barrier ply. In the designs of the known insulating panel provided for practical use two fibre-reinforced structural polymer resin plies are provided, between which the barrier ply is arranged. The structural polymer resin plies and the barrier ply are bonded via an integrally joined connection to form a solid laminate. The other top layer associated with the free environment when in use, on the other hand, in the designs provided for practical use is manufactured as a single layer from gas impermeable thick metal sheet, such as a thick aluminium or steel sheet. In the known insulating panel, between the top layers an insulating core layer is disposed as usual, comprising a foamed plastic. In order to ensure a durable bonding of the core layer to the outer top layers, in the top layer designed as a laminate top layer, the fibres of the fibre-reinforced structural polymer resin ply associated with the core layer provide a bonding surface for the foam of the core layer. Because following foaming of the core layer the fibres of the structural polymer resin ply engage in the core layer, the intention is that a strong integrally joined connection is achieved, which despite its poor adhesiveness guarantees a durable bond between the foam of the insulating core layer and the associated structural polymer resin ply of the top layer.

SUMMARY OF THE INVENTION

Against the background of the prior art described above the problem for the invention was to provide a box body that can be economically manufactured and at the same time offer an optimum combination of minimal weight, high strength and inherent stability and a high insulation effect.

As a solution to this problem the invention proposes a box body with the features described herein.

In accordance with the prior art initially described, a box body for a commercial vehicle according to the invention comprises at least one surface element with at least one panel, comprising a core layer, formed from a foamed plastic, a dimensionally stable structural layer and an intermediate layer, adjacent on one side to the core layer and on the opposite side to the structural layer. The surface elements of a box body according to the invention typically constitute a side wall, a dividing wall or a roof element, via which the load compartment surrounded by the box body is provided with a thermally insulated screen from the environment.

According to the invention the intermediate layer now has a thickness, which is at most the same as the density of the structural layer, and comprises a material, having a thickness which is greater than the density of the core layer, wherein the side of the intermediate layer abutting the core layer has an affinity to the adjacent foamed plastic of the core layer and the side of the intermediate layer abutting the structural layer has an affinity to the adjacent material of the structural layer and wherein an integrally joined connection between the structural layer and the side of the intermediate layer associated with it on the one hand and between the core layer and the side of the intermediate layer associated with it on the other is created.

The invention is thus based on the concept of disposing between the foamed core layer, which thus has only limited strength, and a structural layer guaranteeing the inherent stability and mechanical load capability including of a panel according to the invention an intermediate layer which like a double-sided adhesive tape guarantees a good bond of the core layer to the structural layer. Here the intermediate layer does not necessarily act as an active adhesive, however, but primarily provides adhesive surfaces which are created in such a way that the material of the respective attaching other layer of the panel bonds there and a durable and secure integrally joined combination of intermediate layer, core layer and structural layer is achieved. By means of the intermediate layer, therefore, structural layers and core layers can be durably and securely bonded together, which without such means would not form an integrally joined connection together having the required reliability. In this way, the intermediate layer offers greater flexibility and freedom in the selection of the materials necessary for the structural layer.

Here the thickness of the intermediate layer of a panel designed in accordance with the invention is at most the same, in particular, however, less than the thickness of the structural layer. The advantage of this is that for a given total thickness of the panel a maximum volume in particular for the foamed core layer is available. Thus the total thickness of the intermediate layer provided for according to the invention is typically limited to a maximum of 1 mm, wherein in a practical design the total thickness of the intermediate layer is up to 400 µm, for example 15-350 µm, in particular at least 30 µm or at most 250 µm or at least 50 µm and at most 150 µm.

At the same time, the intermediate layer provided for according to the invention comprises a material having a higher density than the plastic foam of which the core layer is comprised. This allows the intermediate layer to perform other functions apart from bonding the structural layer and core layer. Thus the intermediate layer can enhance the reinforcing effect of the structural layer and so contribute to a maximum inherent stability of a panel provided for according to the invention.

Alternatively, or in addition, the intermediate layer can also act as a barrier ply, preventing the ingress of gaseous or liquid media into the porous and as a rule absorbent core layer. This particularly important practical design offers greater freedom in the selection of the material of the core layer and the structural layer. Thus through an intermediate layer acting as a barrier the materials used for the structural layer can be selected primarily from the point of view of maximum inherent stability, buckling strength and similar, while for the core layer economical open-pore foams can be used.

For the intermediate layer to offer a barrier to the diffusion of gases, vapours, in particular water vapour, or liquids within the panel or through the panel, it may be appropriate, to provide a separate ply in the intermediate layer, that performs this function, while at least one further layer is present, which for example provides a required strength of the intermediate ply or which provides the necessary affinity for the integrally joined connection to the adjacent layer. Through a multi-layer structure of the intermediate ply, therefore, varying physical characteristics can be provided for the intermediate ply as well.

The macrostructure of the intermediate layer can be selected according to the respective functional purpose. Thus in the event of a full-surface continuous bonding of the core or structural layer to the intermediate layer being desired, the intermediate layer can usefully take the form of a uniform closed ply. This is obviously also indicated at least in the areas of the panel in which penetration by gaseous or liquid media can occur, if the intermediate layer is to form a barrier, to protect the core layer against ingress of such media. It can also be advantageous, however, to provide the intermediate layer with a rough, perforated, meshed or other design of structure having peaks, valleys, holes or similar, in order for example to support the integrally joined connection of the structural layer or the core layer to the intermediate layer through a form- or force-fit combination. To this end it is conceivable for example for the intermediate layer to comprise a flat web, a perforated plate, a porous layer or a perforated film or similar.

The at least one intermediate layer of a panel in a body provided according to the invention usefully comprises at least one structure-forming ply in a plastic, a metal, a metal alloy, a metal-containing plastic or a metallised plastic. Should a plastic be used for this, then for example polypropylene (PP), biaxially oriented polypropylene (BOPP) or polypropylene terephthalate (PET) can be considered. A suitable metal or metal alloy for the structure-forming ply of the intermediate layer provided according to the invention is in particular aluminium and its alloys. For this purpose, thin steel sheets or films are also conceivable, however, which are selected in view of their resistance to corrosive attack. In the event of a metal-containing plastic being used for the structure-forming ply of the intermediate layer, it has proven to be an advantage if the metal particles of the plastic matrix have a finely dispersed distribution, with an optimum effect being arrived at if the metal particles are present in the form of flat platelets. Similarly, the structure-forming ply of the intermediate layer can be formed as a combination of a carrier ply in plastic and a metal layer applied to this in a suitable manner, such as by rolling on or vaporisation.

The thickness of the respective structure-forming ply of the intermediate layer is typically 15-250 µm, in particular 30-150 µm or 50-100 µm. This also applies if the intermediate layer consists solely of its structure-forming ply, and thus in particular has no bonding agent plies, as explained further on.

According to the above explanations, the intermediate layer can comprise a single- or multi-layer thin sheet, a sheet-like film, or a ply created by an application method such as vaporisation, spreading, spraying and the like, on the structural layer or core layer serving as a carrier. It is crucial that the intermediate layer, independently of the way in which it is applied guarantees in each case an integrally joined connection between it and the respective adjacent core or structural layer.

The respective affinity provided for according to the invention for this, of the intermediate layer for the associated structural and core layer means, on the one hand, that the side of the intermediate layer associated with the core layer is such that the material of the core layer creates with the side of the intermediate layer concerned a strong integrally joined connection, and that on the other hand a similarly large area and durable, secure integrally joined connection between the structural layer and the side of the intermediate layer associated is arrived at.

Here, within the meaning of the invention essentially surfaces with such affinity are those which allow the generation of high adhesive forces, in particular an integrally joined connection, such as for example adherence or sticking, with the respective adjacent layer (structural or core layer).

Accordingly, the affinity of the respective sides of the intermediate layer are matched to the particular characteristics and adhesion behaviour of the respective layer of the panel with which it is associated. This means that where different materials are used for the core layer and structural layer with differing propensities of these materials to adhere to other materials the affinity of the structural layer and the sides of the intermediate layer associated with the core layer must be just as different. If on the other hand the structural layer and the core layer behave the same when forming integrally joined connections, then the affinities of the two sides of the intermediate layer to the material of the respective adjacent layer can on the other hand be the same of course.

The necessary affinity of the intermediate layer to the respective adjacent material can be created by a chemical or physical or mechanical pre-treatment of the respective side of the intermediate layer. The at least one side can thus be designed or pre-treated in such a way, that the desired affinity is provided. If necessary, the intermediate layer can be selected so that even without a special design or pre-treatment this has a higher affinity to the structural layer than the core layer and/or a higher affinity to the core layer than the structural layer. In this way structural layers and core layers with a very low affinity to each other can be bonded together. In this connection it is particularly effective if at least one side of the intermediate layer is designed or pre-treated so that the desired affinity is achieved, which differs from the affinity of the opposite side of the intermediate layer. Thus in the threshold between the intermediate layer and the core layer on the one hand and the structural layer on the other, high bonding forces can be achieved.

Overall, the intermediate layer provided according to the invention on a panel provided for a box body according to the invention allows structural layers to be used with physical characteristics that to some extent at least are comparable with those of previous outer layers of panels of a box body. In addition, via the intermediate layer apart from the bonding of the core layer to the structural layer at least one further physical characteristic of the panel can be provided, which does not necessarily have to be a characteristic of the structural layer.

The invention thus provides a box body, in which surface elements are used that are less expensive, at least in terms of optimisation of the performance characteristics of their panel, with which a durable and secure bonding between the structural and core layers is ensured through the intermediate layer disposed between them.

Of the individual layers of a panel provided according to the invention, the foam core layer is by far the thickest. Thus the thicknesses of the core layers, depending upon the degree of thermal insulation required is typically in the range 20-145 mm. But greater thicknesses are also possible, if these are needed due to particular demands on the insulation effect or particular climatic conditions, under which the box body is used.

In a panel according to the invention the core layer can be foamed on to the intermediate layer present. From a production engineering point of view, it proves particularly advantageous here if to begin with the intermediate layer is applied to the structural layer and then the core layer is foamed onto the intermediate layer. This proves to be particularly beneficial, if on a panel according to the invention the core layer is formed between two fixed layers disposed a distance apart and forming the outer face of the panel, between which in the manufacture of the panel the foam of the intermediate layer is introduced. The intermediate layer provided according to the invention at least on the side associated with the core layer of at least one of the two layers forming the outer face ensures here that when the core layer foam is introduced an integrally joined, durable connection of the outer layer concerned, to the core layer is achieved by the respective outer layer of the panel formed by the structural layer.

A particularly good thermal insulation effect of the core layer can be achieved if the core layer is comprised a polyurethane foam. Such foams can be foamed particularly easily onto the respective intermediate layer. As the plastic foamed onto the intermediate layer in this way hardens, the desired integrally joined connection between the intermediate layer and the core layer is achieved.

An embodiment of the invention that can be implemented in practice at low cost consists of integrally joined connection of the intermediate layer of the at least one panel present in a box body according to the invention exclusively to the structural layer or the core layer. This simplifies the manufacturing process of the respective panel.

In order to securely and durably bond the core layer or the structural layer with the intermediate layer, depending on the choice of material it may be advantageous, if the intermediate layer on its side adjacent to the core layer has a bonding agent ply, ensuring an integrally joined connection between the core layer and the intermediate layer. Alternatively, or additionally, the intermediate layer can also have on its side adjacent to the structural layer an outer bonding agent ply, ensuring the integrally joined connection of the structural layer to the core layer.

The thickness of the bonding agent plies is in each case a few micrometers, for example a maximum of 10 µm or even a maximum of 5 µm. It is also quite conceivable, however, for the respective side of the intermediate layer to be activated in a known manner by a physical process, such as for example plasma treatment or similar, such that it is ready for bonding of the material of the respective associated structural or core layer.

In the event of a special bonding agent being provided on the respective side of the intermediate layer, this typically acts directly on the interface between the intermediate layer on the one hand and the core layer or the structural layer on the other, so that just small quantities, i.e. in particular very thin ply thicknesses, of the respective bonding agent are sufficient to create the integrally joined connection provided according to the invention. This differentiates bonding agent plies fundamentally from clearly thicker adhesive plies. Here it proves particularly advantageous if the respective bonding agent brings about the wettability of the intermediate layer on the one hand and the core layer or structural layer on the other. Surface-active bonding agents are suitable for this.

In the event of a bonding agent being provided on at least one of the sides of the intermediate ply, from a production engineering point of view this can be applied particularly easily as a lacquer.

The bonding of the core layer described above via an intermediate layer to a dimensionally stable structural layer can be used both on the side of the panel facing the environment and the one facing the load compartment. Therefore, a further design of the invention envisages that on either side of the core layer a structural layer is bonded via which in each case an intermediate layer is bonded in a manner according to the invention to the core layer. An intermediate layer is then provided on each side of the core layer, via which the integrally joined connection of the core layer to the respective structural layer takes place, so that on both sides of the core layer an intermediate layer borders the core layer on its inner side, while the outer side of the intermediate layer adjoins the respective external structural layer.

The function of the structural layer in a panel provided according to the invention is primarily to provide sufficient inherent stability and resistance of the panel to mechanical stress.

If necessary, the structural layer can have further functions and physical characteristics. Maximum design freedom and optimisation of the structural layer can be achieved here by providing a top layer on its side turned away from the core layer. This top layer then forms the outer face of the panel to the environment or to the load compartment of the box body. Accordingly, it can be optimised in terms of the external optical effect of the panel. The top layer can also perform certain functions. For example, the top layer can act as a kind of barrier, preventing the ingress of liquid or gaseous media into the panel. To do so the respective top layer present can be substantially impermeable to gas or vapour.

The structural layer is up to 1 mm thick, typically its thickness is 100-500 μm, in particular 200-400 μm, wherein the thickness of the structural layer is at least the same, but generally greater than the thickness of the intermediate layer, via which it is bonded to the core layer.

Simple manufacture and a simple structure of the panel can be achieved if it is provided that the top layer adjoins the structural layer, wherein here also an integrally joined connection is advantageous from a production engineering point of view.

The top layer can have a characteristic that the structural layer does not have, or be more suited to the bonding of at least one further ply than is the case with the structural layer. In particular, the top layer, on its side turned away from the structural layer, can provide a smooth surface perceived by an observer as optically flawless and which is particularly easy to clean or suited to the application of markings and similar.

In order to perform its intended functions, the top layer can be a metal ply, a metal-containing plastic ply, a metallised ply, a lacquer ply or a plastic film. To this end, the top layer can be formed from light sheet metal, in particular an aluminium sheet. Where a metal-containing plastic is used for the top layer here it can also for example have dispersedly distributed metal particles, present in particular as flat platelets. The top layer can similarly comprise a metallised ply or include such a ply, which for instance can be created by vaporisation with a metallic material.

In order to form an optically attractive and easy-to-clean outer layer of the panel the top layer can comprise a metallic ply, that can support a lacquer ply or a plastic film.

If the top ply or the intermediate layer serve as a barrier to the ingress or penetration of liquids or vapours in or through the panel provided according to the invention, then the layer concerned, as explained above, is either correspondingly fully impermeable to gas and liquids or comprises at least one ply of sufficient imperviousness. The imperviousness necessary in each case is assessed here from the point of view of the environment to which the respective panel is exposed in practice. Gas-, vapour- or liquid-tight barriers in this regard are for example classified as those intermediate or top layers which restrict to a minimum the diffusion of gases, such as oxygen, carbon dioxide or nitrogen, and/or vapours, such as water vapour or pentane gas. The barrier effect does not necessarily just work against the ingress of gaseous or liquid media into the respective panel, but also the escape of gases contained in the respective panel. Thus the core layer of the respective panel may have a gas applied that improves the thermal insulation, such as pentane gas, which must remain in place. A particularly good barrier effect is demonstrated by intermediate and top layers, made of aluminium material. This is the case if the aluminium material in the form of a thin leaf-like film is used as an intermediate or top layer or is provided as a ply of such an intermediate or top layer.

In order for the manufacture of the panels of box bodies for commercial vehicles to benefit as far as possible from common parts and in order to simplify the manufacturing process and if necessary to be able to provide symmetrical characteristics of the panel, it is possible for the respective intermediate layer, for the structural layers and the top layers to have the same design on both sides of the core layer. Differences in the material compositions or layer thicknesses can be tolerated here if necessary. Here it can prove particularly beneficial, however, if the intermediate layers, the structural layers or the top layers in each case have the same design, wherein an identical design and thus in relation to the core layer a smooth symmetrical arrangement of the structural layers, intermediate layers and optionally present top layers is achieved.

The structural layer can for example comprise a plastic, in particular a plastic which is equipped to withstand high mechanical stresses. In themselves known fibre-reinforced plastics are suitable here, which apart from high strength and rigidity at the same time have a particularly low weight.

In order to achieve maximum mechanical characteristics and simultaneously optimised inherent stability of the structural layer, the structural layer can be built from two or more plies. In the event that for two of these plies, fibre-reinforced plastics are used, for the purposes of the most even possible distribution of the characteristics of the structural layer it can be appropriate for the fibres of the two fibre-reinforced plastic plies to each have a preferred direction. By making the preferred directions of the two fibre-reinforced plastic plies differ, for example aligning them perpendicularly to each other, a further increase in the strength or rigidity of the structural layer can be achieved with a simultaneous more even distribution of these characteristics without having to be concerned with the alignment of the panel when mounted in the respective panel. Warping or twisting of the structural layer can be avoided here by providing the structural layer of a panel according to the invention with at least three fibre-reinforced plastic plies, wherein the preferred directions of the fibres of at least two of these plies run parallel to one another and substantially perpendicularly to the preferred direction of the fibres of the at least one further fibre-reinforced plastic ply. Structural advantages can be achieved here if two fibre-reinforced plastic plies with substantially parallel preferred directions of the fibres are disposed on both sides of the further fibre-reinforced plastic ply, the preferred direction of the fibres of at least one of which is aligned almost perpendicularly to the preferred directions of the two other fibre-reinforced plastic plies. If the structural layer has a multi-layer design and all plies of the structural layer are fibre-reinforced plastic plies, wherein optionally all fibre-reinforced plastic plies have a preferred direction of the corresponding fibres and the preferred directions of the fibres of adjacent plies in each case are aligned at an angle to one another, in particular perpendicularly, a bond can be created which guarantees maximum load capability of the structural layer thereby created.

Alternatively, or additionally, to fibre-reinforced plastics, one of the structural layers can also comprise a fibre-reinforced thermoplastic. Such plastics can be formed particularly easily to suit the panel. Furthermore, polypropylene represents a particularly economical thermoplastic material. Here the thermoplastic material concerned can in turn also be fibre-reinforced, in order to provide maximum strength.

BRIEF DESCRIPTION OF THE DRAWINGS

The invention is explained in the following by means of a drawing showing an embodiment. In the drawings.

DESCRIPTION OF THE INVENTION

Figure 1:
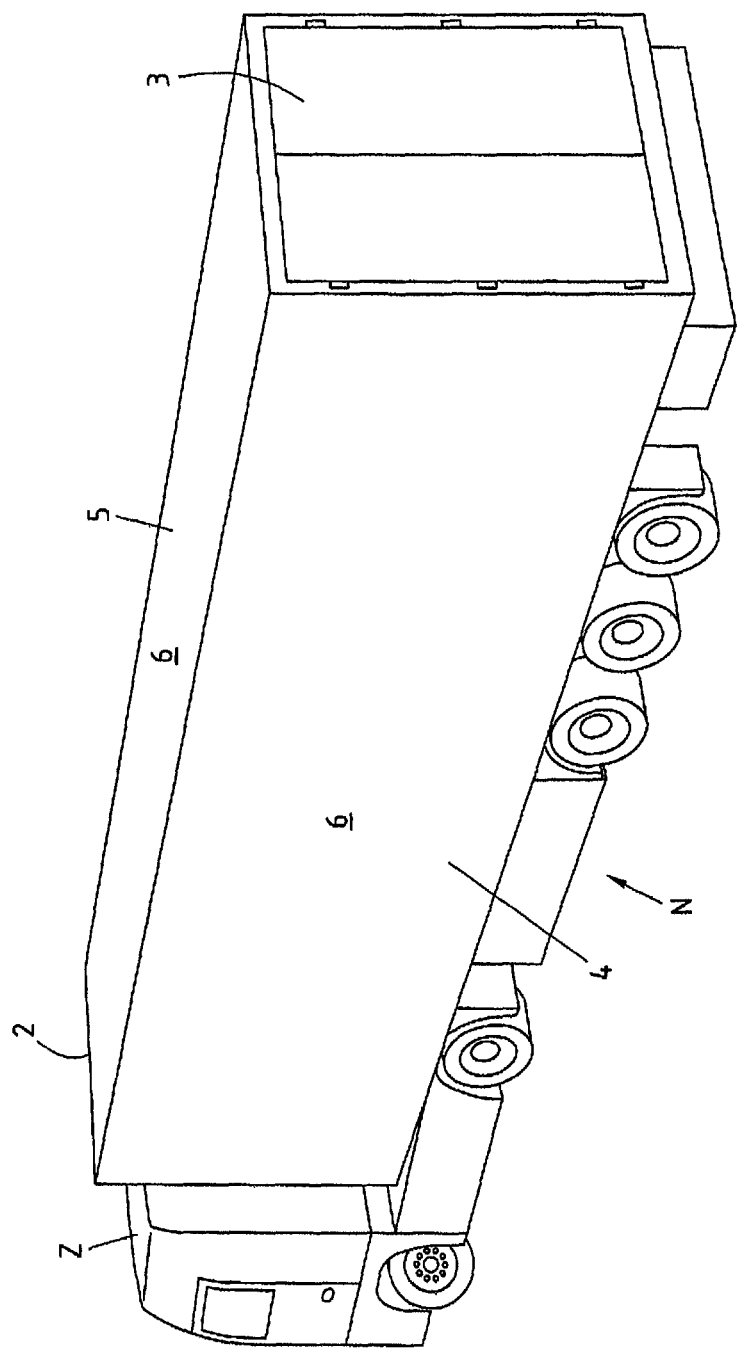
FIG. 1 shows a commercial vehicle with a box body according to the invention in a perspective view and FIG. 2 shows a panel of a side wall of the box body shown in FIG. 1 in a cross-section view transversal to the panel.

FIG. 1 shows a commercial vehicle N in the form of a semitrailer, hauled by a tractor unit Z. The commercial vehicle N supports a closed box body 1, which with a front wall 2, a rear wall 3, two side walls 4 and a roof 5 encloses a load compartment accommodating temperature-sensitive transported goods from the environment outside the box body 1.

In the box body 1 each side wall 4 and the roof 5 comprise surface elements, in the form of multi-layer panels 6. The panels 6 are retained in an in itself known manner in a frame (omitted here for the purposes of clarity), forming the base structure of the box body 1 like a skeleton.

In the box body 1 the structure of the panel 6 of the roof 5 is identical to the structure of the panels 6 of the side walls 4.

Figure 2:
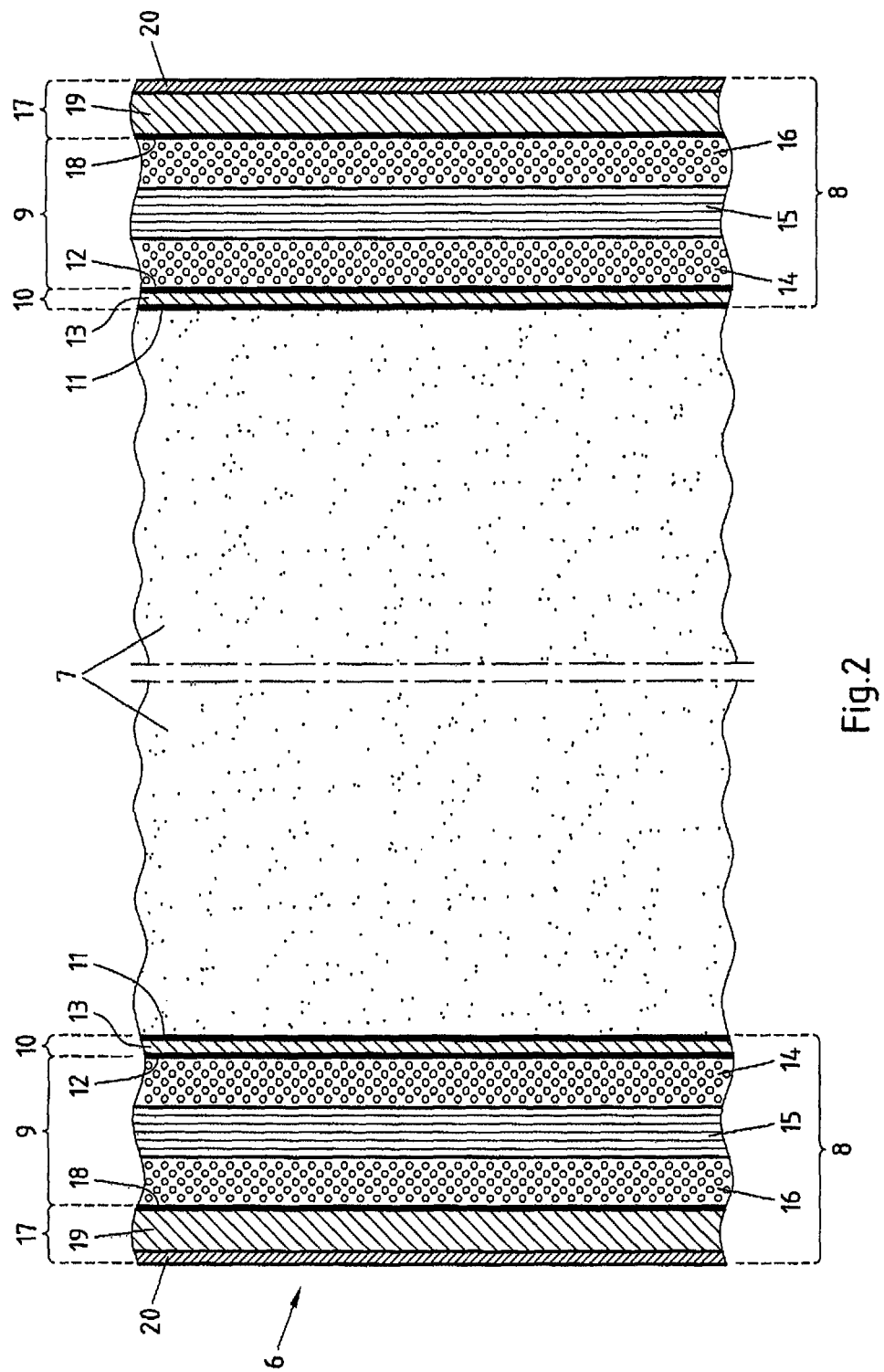

The basic structure of the panels 6 of the roof 5 and the side walls 4 of the box body 1 from FIG. 1 is shown in FIG. 2. In its central area the panel 6 has a core layer 7, comprising a foamed plastic with a closed-pore structure. The plastic foam of the core layer 7 here is for example foamed polyurethane. The core layer 7 is for example 10 cm thick.

Both sides of the core layer 7 are provided with a dimensionally stable outer skin 8.

The dimensionally stable outer skin 8 comprises a dimensionally stable structural layer 9, having an integrally joined connection via an intermediate layer 10 with the core layer 7. To this end each intermediate layer 10 on the side adjacent to the core layer 7 has an inner bonding agent ply 11. On the side of the respective intermediate layer 10 adjacent to the structural layer 9 an external bonding agent ply 12 is provided, in order to achieve the integrally joined connection with the structural layer 9.

The structure-giving ply of the intermediate layer 10 is provided by a metallic film in the form of an aluminium film 13, carrying on its side associated with the core layer 7 the inner bonding agent ply 11 and on its side associated with the structural layer 9 the outer bonding agent ply 12. The bonding agent plies 11,12 are in each case applied as layers of lacquer.

Here the aluminium ply 13 typically has a thickness of 30 µm to 100 µm, so that the total thickness from the bonding agent plies 11,12 and the structure-giving aluminium film 13 of the intermediate layer 10, with a thickness of a few micrometers of the layers 11,12, is typically >30 µm to 150 µm or 50 µm to 110 µm.

Independently of the embodiment described here in practice for the structure-giving ply of the intermediate layer 9 ply thicknesses of typically 70 µm are intended, so that in this case the total thickness of the intermediate layer 10 taking into account two bonding agent plies of a few µm thickness applied to the structure-giving ply, is in the range >70-80 µm.

In any case, the thickness of the intermediate layers 10 is in each case drastically less than the thickness of the core layer 7 and similarly significantly less than the thickness of the structural layer 9.

The structural layer 9 of the panel 6 has a multi-layer structure and comprises three plies 14, 15, 16, consisting of fibre-reinforced plastic. Each of these fibre-reinforced plastic plies 14, 15, 16 is approximately 100 µm to 500 µm, in particular 200 µm to 400 µm, thick. The fibres of the fibre-reinforced plastic plies 14, 15, 16 are in each case aligned in a preferred direction, wherein the fibres in the structural layer 9 are in the form of a fibre sheet. The preferred directions of the fibres of the two outer fibre-reinforced plastic plies 14, 16 of the respective structural layer 9 have an identical preferred direction. The fibre-reinforced plastic ply 15 provided between them on the other hand has a preferred direction of the fibres, which are aligned perpendicularly to the preferred direction of the fibres of the adjacent plies 14, 16 of fibre-reinforced plastic. The preferred directions of the fibre-reinforced plastic plies 14, 15, 16 are in each case aligned parallel to the plane of the respective layer 14, 15, 16.

The fibres of plies 14-16 of the structural layer 9 involve for example glass fibres. Alternatively other fibres, such as plastic fibres, basalt fibres, carbon fibres or graphite fibres could also be used, however, as reinforcement. For the plastic forming the matrix of the fibre-reinforced plastic plies 14, 15, 16 polypropylene is, for example, provided for. For this purpose, however, basically almost any thermoplastic material could be used. Polyamide, for example, has also proven suitable.

On the outer sides associated with the free environment of the box body 1 or the load compartment enclosed by box body 1 of the two structural layers 9 in each case a top layer 17 is provided, which is bonded via a bonding agent ply 18 with the structural layer 9. The top layer 17 has a metallic ply 19, comprising aluminium and which is approximately 100 µm to 400 µm, in particular 200 µm to 300 µm, thick. On the outer side of the metallic ply 19 a lacquer ply 20 is provided, which forms the respective outer face of the panel 6 to the load body 1 enclosed by the box body 1 or to the free environment of the box body 1. Alternatively, or additionally to the lacquer ply 20 a film or a composite film could also be provided.

The panel 6, in terms of the core layer 7, the intermediate layers 10, the structural layers 9 and the top layers 17 has a substantially symmetrical structure, in particular symmetrical to a plane of symmetry running through the centre position of the panel 6. Here the thicknesses of the individual layers of the two outer skins 8 of panel 6 are the same. In addition, the materials used for the corresponding layers or plies are the same.

In connection with the structure shown in FIG. 2, and to that extent preferred, of a panel 6, it is pointed out that with this individual layers or plies can if necessary be omitted or if necessary replaced by at least one other layer or ply, without this affecting the remaining structure of the panel. Thus many different alternative embodiments are conceivable, which for the sake of clarity, however, have not been shown and described as separate embodiments in the detailed description.

Regarding the terms "layer" and "ply" used above it is pointed out that a "layer" can preferably be an element of the panel that can be separately provided and/or managed, whereas a "ply" is preferably not separate, but is merely managed together with at least one other ply as a layer and used for manufacturing the panel.

NUMERALS

N Commercial vehicle
Z Tractor unit
1 Box body
2 Front wall of the box body 1
3 Rear wall of the box body 1
4 Side walls of the box body 1
5 Roof of the box body 1
6 Panel
7 Core layer of the panel 6
8 Outer skins of the panel 6
9 Structural layers of the panel 6
10 Intermediate layers of the panel 6
11 Respective inner bonding agent ply of the intermediate layers 10
12 Respective outer bonding agent ply of the intermediate layers 10
13 Aluminium film of the intermediate layers 10
14-16 plies of the structural layers 9 comprising fibre-reinforced plastic
17 Top layers
18 Bonding agent plies
19 Respective metallic ply of the top layers 17
20 Lacquer plies

The invention claimed is:

1. A box body for a commercial vehicle, wherein the box body has at least one surface element having at least one panel, which comprises a core layer, formed from a foamed plastic, a dimensionally stable structural layer and an intermediate layer, a first side of the intermediate layer being adjacent to the core layer and an opposite, second side being adjacent to the structural layer, wherein an integrally joined connection is produced between the structural layer and the second side of the intermediate layer and between the core layer and the first side of the intermediate layer, wherein the intermediate layer has a thickness, which is at most the same as the thickness of the structural layer, wherein the intermediate layer comprises a material, the density of which is greater than the density of the core layer, wherein the side of the intermediate layer adjacent to the core layer has an affinity to the adjacent foamed plastic of the core layer, wherein the side of the intermediate layer adjacent to the structural layer has an affinity to the adjacent material of the structural layer, and wherein the intermediate layer is bonded exclusively by an integrally joined connection with the structural layer and the core layer due to adherence or sticking.

2. The box body according to claim 1, wherein the intermediate layer on the first side adjacent to the core layer has an inner bonding agent ply, which guarantees the integrally joined connection of the core layer to the intermediate layer, or wherein the intermediate layer on the second side adjacent to the structural layer has an outer bonding agent ply, which guarantees the integrally joined connection of the intermediate layer to the structural layer.

3. The box body according to claim 2, wherein the inner or outer bonding agent ply is applied as a lacquer.

4. The box body according to claim 1, wherein the intermediate layer comprises, metal, a metal-containing plastic or a metallized plastic ply.

5. The box body according to claim 1, wherein the intermediate layer is disposed on both sides of the core layer, between the core layer and respective structural layer.

6. The box body according to claim 1, wherein the core layer is foamed onto the intermediate layer.

7. The box body according to claim 1, wherein a top layer is provided on the side of the structural layer turned away from the core layer.

8. The box body according to claim 7, wherein the top layer is a metallic ply, a metal-containing plastic ply, a metallised ply, a lacquer ply or a plastic film.

9. The box body according to claim 7, wherein the intermediate layers, structural layers or top layers have an identical structure to one another on both sides of the core layer.

10. The box body according to claim 1, wherein the intermediate layer or a respectively present top layer is substantially gas impermeable or vapour impermeable.

11. The box body according to claim 1, wherein the structural layer consists of plastic.

12. The box body according to claim 1, wherein the structural layer comprises several plies.

13. The box body according to claim 12, wherein the plies are formed from a fibre-reinforced plastic, the fibres of at least two fibre-reinforced plastic plies are aligned in a preferred direction and that the preferred directions of the fibres of the two fibre-reinforced plastic plies are aligned perpendicularly to one another.

14. The box body according to claim 1, wherein the intermediate layer consists of at least one structural layer in fibre-reinforced polypropylene or light sheet metal.

15. The box body according to claim 8, wherein the intermediate layers, structural layers or top layers have an identical structure to one another on both sides of the core layer.

* * * * *